March 31, 1970 L. A. STAPLES 3,504,260
MOTION SYSTEM ELECTRICAL CONTROLS
Filed April 19, 1967

INVENTOR
LYNN A. STAPLES

BY *William Gorobman*

ATTORNEY

United States Patent Office 3,504,260
Patented Mar. 31, 1970

3,504,260
MOTION SYSTEM ELECTRICAL CONTROLS
Lynn A. Staples, Greene, N.Y., assignor to Singer-General Precision Inc., a corporation of Delaware
Filed Apr. 19, 1967, Ser. No. 631,997
Int. Cl. H02p 5/40
U.S. Cl. 318—331                                     3 Claims

ABSTRACT OF THE DISCLOSURE

This disclosure describes an electronic control system for electrical motor drive means. An electrical motor is supplied with power through any of several types of solid-state electronic valves. The amount of conduction through the valves is determined by the frequency of oscillation of a controllable oscillator whose frequency is determined by the control input. In order to stabilize this system and to render it under the complete control of the single controlling input without undue interference, without external transients, without hunting and the like, the motor energization is periodically turned off, and, while coasting during a portion of the operating cycle, its reverse EMF is sampled and used as a feedback to one input of a differential amplifier wherein it is differentially combined with the control input which is also applied to the differential amplifier.

---

This invention relates to electrical control systems, and more particularly to systems for readily controlling the operation of electric motors.

One problem in the past has been the control of an electric motor at very low speeds so that its speed and direction of rotation are accurately and readily controllable. Several systems in the past have been devised, which systems include: periodically energizing the motor to cause it to inch, using a plural phase motor with complex phase-control equipment to cause the motor to assume the position of the input control device, operating an alternating current motor at its slip-stall threshold, and the like. However, the smooth, ready control of both the direction and the speed of rotation of an electric motor without unduly subjecting the motor to high stresses has yet to be satisfactorily accomplished without going to over-sized motors and complex electrical systems.

It is an object of this invention to provide a new and improved electrical motor drive means.

It is another object of this invention to provide a new and improved electrical control system for an electric motor.

It is a further object of this invention to provide a new and improved electronic control system for controlling the ready and smooth operation of an electric motor.

Other objects and advantages of this invention will become apparent as the following description proceeds, which description should be considered together with the accompanying drawings in which.

Figure 1:
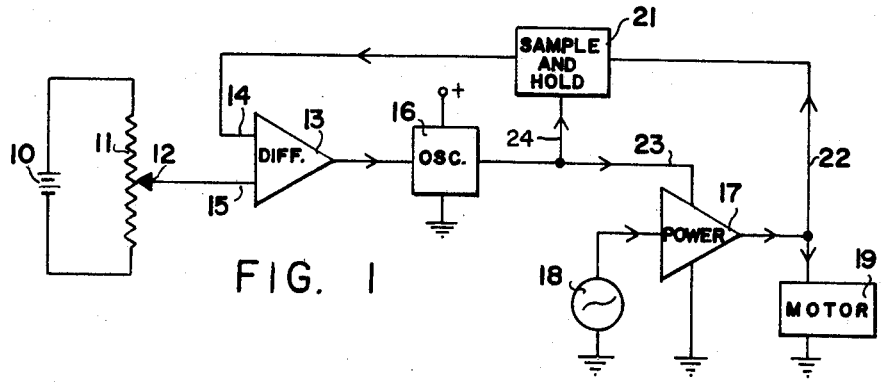
FIG. 1 is a block diagram of a control system according to this invention.

Referring now to the drawings in detail, and more particularly to FIG. 1, the reference character 11 designates a potentiometer connected across a source of electrical energy 10 and having a slide contact 12. The slide contact 12 is connected to one input 15 of a differential amplifier 13, which also has a second input 14. The output from the amplifier 13 is connected to the control input of a voltage controllable oscillator 16, the output of which is connected through a line 23 to control a power amplifier 17. The amplifier 17 is connected across a source of alternating current 18, and has its output connected to the input of an electric motor 19. The input of the electric motor 19 is also connected through a line 22 to the input of a sample-and-hold device 21 the output of which is applied to the second input 14 of the differential amplifier 13. The time during which the sample-and-hold device 21 does its sampling is controlled by the oscillator 16 through a line 24.

In operation, the position of the potentiometer slide 12 along the potentiometer 11 is controlled by any external means which is used as the motor control. This may be a control lever, a throttle handle, a control wheel, or similar device. The position of the slide 12 determines the voltage which is applied to the input 15 of the differential amplifier 13. Or, the potentiometer 11 may be replaced by a source of variable potential such as an analog computer. The voltage applied to the input 15 determines the output from the amplifier 13, and this, in turn, determines the control potential applied to the oscillator 16. The oscillator 16 may be any suitable oscillator whose frequency can be controlled within limits by the amplitude of an input signal so that the frequency of the output from the oscillator 16 is determined by the potential output from the amplifier 13. The output from the oscillator 16 is applied through the line 23 to a control input of a power amplifier 17 which may be any sort of electronic valve system whose output is determined by an input signal. The power which is supplied to the motor 19 and determines its operation comes from the source 18 which may be any suitable source of such power, shown here as a source of alternating current but which may be a source of direct current just as well. The power amplifier 17 is constructed to apply power from the source 18 to the motor 19 during those periods of time that the signal on the line 23 is of a prescribed polarity and above the prescribed voltage value. To control the amount of power which is supplied to the motor 19 from the source 18, the intervals of time during which the line 23 becomes, say, positive above the threshold voltage is controlled by the oscillator 16. This is particularly true if the power amplifier 17 comprises unidirectional conductive devices. Then, the amount of time during which the amplifier 17 conducts is controlled by the amount of time that the source 18 and the line 23 are both of the required polarities. Assuming, for this discussion, that the amplifier 17 is made up of devices which conduct only when the potential applied across them from the source 18 is positive and also when the potential applied along line 23 to their control means has exceeded a prescribed positive potential. If the output from the source 18 and the signal appearing on line 23 are both of the same frequency, then the timing between the two signals will determine the amount of time that the polarities are proper for conduction through the amplifier 17. One way in which this proper timing can be accomplished is by varying the frequency of the signal along the line 23. The time relationship between the signal on the line 23 and that of the source 18 is determined by the frequency difference between the two signals. This frequency difference can be determined by controlling the frequency of the oscillator 16 in accordance with the output of the amplifier 13. However, one of the problems is that the output of the amplifier 13 is subject to drift due to changes in temperature and other environmental conditions. In order to overcome this possibility, a second signal is applied to the other input 14 of the amplifier 13 so that the amplitude of the output of the amplifier 13 is proportional to the difference between the amplitudes of the two signals. The signal which is applied to the input 14 is usually acquired from a generator which is driven by the motor 19. This adds to the cost and the weight, as well as to the maintenance problems of the entire system. To avoid these problems and yet to accomplish the necessary function of a negative feedback path, the drive of the motor 19 is periodically interrupted, and during the period of time that the motor 19 is coasting, the counter electromotive force (CEMF) of the motor 19 is sampled along line 22 by the sample-and-hold circuit 21 which may be of the type disclosed in the copending application SN 514,524, filed on Dec. 17, 1965, in the name of Robert P. Rodgers. Since the sample-and-hold circuit should sample only during the time that the motor 19 is coasting and not during the time when there is an output signal from the amplifier 17, the sample-and-hold circuit 21 has applied to it a signal along line 24 from the oscillator. The system is so organized that if a positive polarity is required on line 23 to permit the amplifier 17 to conduct, then a negative polarity applied along line 24 should open the sample means in the sample-and-hold 21. Thus, the sample-and-hold circuit 21 samples the potential existing on line 22 only when there is no output from the amplifier 17. The output from the sample-and-hold circuit 21 is applied to the other input 14 of the amplifier 13. This signal applied to input 14 is differentially summed in the amplifier 13 with the signal at the input 15. Thus, if the signal applied to the input 15 goes up, and the output from the power amplifier 17 also goes up in response thereto, then the motor 19 speeds up, its CEMF applied to line 22 increases, and the output from the sample-and-hold circuit 21 applied to the input 14 also increases. This tends to reduce the output of the amplifier 13. However, should the motor 19 slow down, then the CEMF at line 22 decreases, and the signal at the input 14 decreases to increase the difference between the signals on the inputs 14 and 15 and increase the output of the amplifier 13. The effect of the feedback path through the sample-and-hold circuit 21 is to reduce the effects of outside influences on the amplifier system controlling the motor 19 and to render the control of that motor more nearly dependent upon the position of the slide contact 12. Of course, it must be realized that the potentiometer 11 and the slide contact 12 are used here merely as examples of control devices for the input 15 of the amplifier 13. This arrangement could be replaced by a computer, either digital or analog, a DC servo, or other similar devices.

Figure 2:
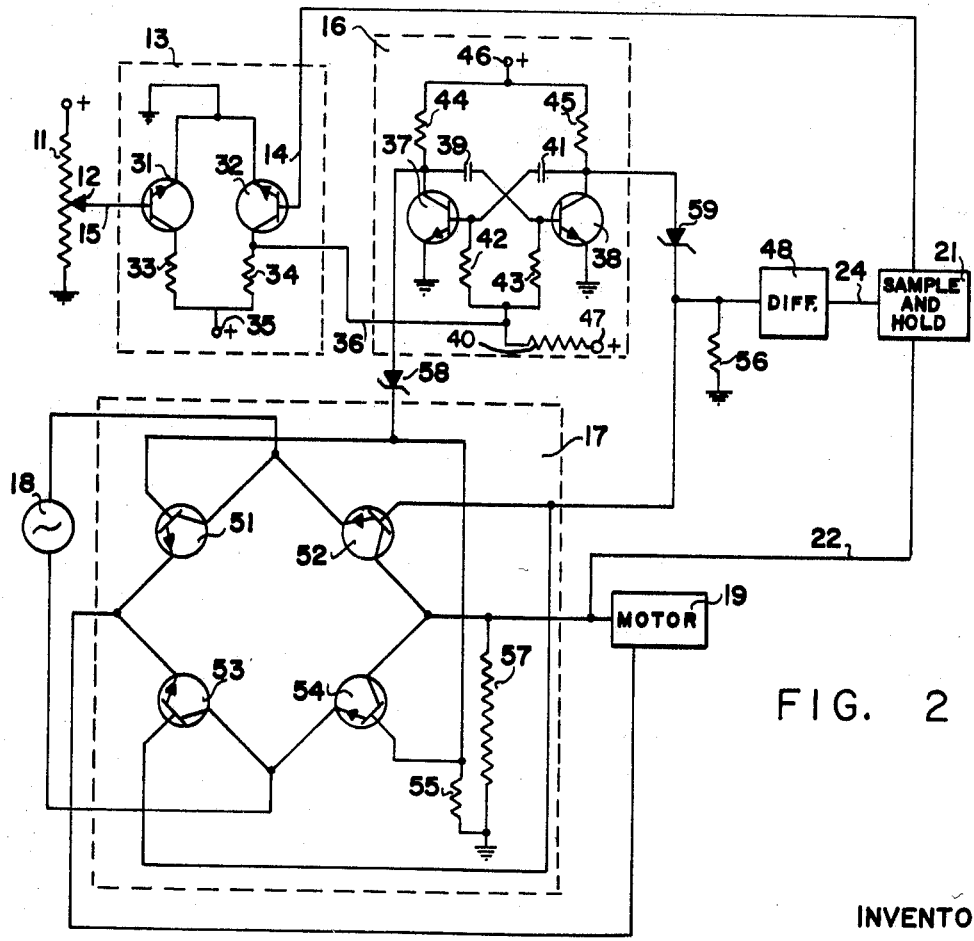
FIG. 2 is a schematic electrical wiring diagram of the control system of FIG. 1.

Examples of the circuitry which could be used in the system of FIG. 1 are shown in the schematic wiring diagram of FIG. 2. The same reference characters are used in the two figures to denote the same components. The amplifier 13 is shown in dashed lines comprising the transistors 31 and 32. Transistor 31 comprises a base electrode to which the input 15 is applied from the slide 12 of the potentiometer 11, and the transistor 32 comprises a base electrode to which the input 14 is applied. The transistors 31 and 32 further comprise emitter electrodes which are connected together and to ground. The collector electrode of transistor 31 is conected through a load resistor 33 to a terminal 35 to which a source of positive potential may be connected, and the collector electrode of the transistor 32 is similarly connected through a load resistor 34 to the terminal 35. The output from the amplifier 13 is taken across the load resistor 34 through the line 36 and is applied to the input of a multivibrator oscillator 16. The oscillator 16 comprises a free-running multivibrator formed of transistors 37 and 38 cross-connected as are all similar multivibrator circuits. The transistor 37 comprises a base electrode which is connected through limiting resistors 40 and 42 to a terminal 47, to which a source of positive potential is applied, and through a capacitor 41 to the collector electrode of the transistor 38. The base electrode of the transistor 38 is connected through limiting resistors 40 and 43 to the terminal 47 and through a capacitor 39 to the collector electrode of the transistor 37, which is connected through a load resistor 44 to a terminal 46 to which a source of electrical power may be connected. The collector electrode of transistor 38 is connected through a load resistor 45 to the terminal 46. The emitter electrodes of both transistors 37 and 38 are grounded. One output from the oscillator 16 is taken across the load resistor 44 and is applied to the control input of a power amplifier 17 which comprises, in this example, a standard bridge formed of four transistors 51, 52, 53 and 54, each of which transistors comprises an arm of the bridge. The source 18 is connected across one diagonal of the bridge, while the output is taken across the other diagonal of the bridge and is applied across an output resistor 57 to the motor 19. One output from the oscillator 16 is derived across the load resistor 44 and is applied through a threshold device such as Zener diode 58 to the base electrode of transistors 51 and 54 which are in opposite arms of the bridge, while another output of the oscillator 16 is taken across the load resistor 45 and is applied through a similar threshold device such as Zener diode 59 to the base electrodes of the transistors 52 and 53 which are in the other two opposite arms of the bridge. Thus, since the two outputs from the oscillator 16 are, at any time, of opposite phase, only two opposite diagonals of the bridge are conductive at any time. The transistors 51, 52, 53 and 54 are so arranged as to form a full-wave rectifier with two transistors in opposite arms being conductive at any time. In addition, the output from the oscillator 16 which is taken across the load resistor 45 is additionally applied across a resistor 56 to the input of a differentiator 48 and then to line 24 to control the sample-and-hold circuit 21. Thus, the sample-and-hold circuit 21 only samples the potential on the line 22 from the motor 19 during the brief interval that there is an output pulse from the differentiator 48 of the proper polarity. The output from the sample-and-hold circuit, as explained above, is applied to the input 14 of the differential amplifier 13.

The operation of this circuit has been explained in some detail in connection with the explanation of FIG. 1 and further explanation will be brief. The two inputs 14 and 15 to the amplifier 13 are applied to reversely connected transistors 31 and 32. Therefore, the potential which appears across the load resistors 33 and 34 is proportional to the difference between the two input signals applied to the two inputs 14 and 15. The multibrator 16 operates as does any standard multivibrator. The frequency depends upon the time constants of the resistor-capacitor combinations 39–43 and 41–42. However, the initial potential applied across the capacitors 39 and 41 helps determine the time required to charge up those capacitors to the point where the respective transistor 37 or 38 conducts. This potential is determined, in part, by the value of the voltage applied to terminal 47 and in part by the signal applied along line 36 from the differential amplifier 13. The higher the initial potential applied to the capacitors 39 and 41, the faster they will charge to the point where the respective transistors 37 and 38 conduct, and the higher the frequency of oscillation of the oscillator 16. The output voltages across the two load resistors 44 and 45 of the oscillator 16 are of opposite-going polarities at any time. Therefore, when the transistor 37 begins conducting, a negative-going pulse appears across the load resistor 44 while, at the same time, the transistor 38 is becoming non-conductive and a positive-going pulse appears across load resistor 45. As mentioned above, the amplifier 17 comprises a bridge in which each of the arms is formed by a transistor. Since the transistors are arranged to form a full-wave device, they conduct alternately. Therefore, the two outputs from the multivibrator 16 are applied to alternate transistors 51, 52, 53 and 54 so that at any time the two transistors adjacent each other in the bridge of the amplifier 17 will have control signals of opposite polarities, and one will be conductive while the other will not be. The Zener diodes 58 and 59 prevent conduction from the multivibrator 16 outputs through the resistors 56 and 57 until a threshold voltage is reached. Assume for this discussion that transistors 51 and 54 are conductive at any time. When the output from the source 18 is positive at the upper junction of the bridge, and a positive potential is applied to the collector electrode of the transistor 51 and a negative potential is applied to the emitter electrode of the transistor 54, then current flows through transistor 51, through the left-hand junction of the bridge to the motor 19, through the motor 19 to the right-hand junction of the bridge, through transistor 54 and back to the other side of the source 18. On the other half-cycles the other transistors 52 and 53 become conductive and the lower junction of the bridge becomes positive so that current then flows from the lower junction of the bridge, through the transistor 53, through the left junction of the bridge, to the motor 19, through the motor 19 to the right junction of the bridge and through the transistor 52 back to the cource 18. If the operation of the system is such that the transistors are not turned on at the same time that a positive potential is applied across them from the source 18, then there are intervals when there is no conduction through the bridge 17 and the motor 19 has no input power applied to it. This is achieved for a short time each half-cycle by the Zener diodes 58 and 59. During those intervals, the motor 19 coasts, generates its counter electromotive force, and the sample-and-hold circuit 21 samples and stores it for application to the other input 14 of the amplifier 13. The differentiator 48 is used to differentiate the output pulses from the multivibrator 16 to produce very sharp pulses of short duration so that the sample-and-hold circuit 21 samples line 22 for only a short period of time. The short spike pulses from the differentiator 49 coincide with the times that there is no conduction through the diodes 58 and 59. In this way, the sampling is restricted to the period during which the motor 19 coasts.

The system shown in FIGS. 1 and 2 is the basic system according to this invention, but it responds to produce rotation in the motor 19 in only one direction. It is often desirable to produce reversible rotation as the slide 12 of the potentiometer 11 passes through a center point. Consider the potentiometer 11 connected with one source of potential having its positive terminal connected to the upper end of the potentiometer 11 and a second source of potential with its negative terminal connected to the lower end of the potentiometer 11. The other ends of both sources are connected together and to the center of the potentiometer 11. Then, as the slide 12 moves upwardly, the potential applied to it increases in a positive direction. On the other hand, when the slide 12 moves downwardly from the center of the potentiometer 11, the potential applied to it increases in a negative direction. Slide contact 12 can then be connected to the inputs of a pair of gate circuits such that when a positive potential appears on the slide 12, one gate opens, and when a negative potential appears on the slide 12, the other gate opens. Each gate would control the application of the potential output from the oscillator 16 to the power amplifier 17 so that only one pair of transistors 51, 52, 53 and 54 are conductive at any time. Instead of the full-wave connection shown, the motor 19 would be so connected to the transistors 51, 52, 53 and 54 that when transistors 51 and 54 conduct, the motor 19 rotates in one direction, and when transistors 52 and 53 conduct, the motor 19 rotates in the opposite direction. The amount of power applied to the motor from each pair of transistors 51–54 would still be proportional to the frequency output from the oscillator 16, whose frequency would still depend upon the potential applied to its input, of course, this is but one embodiment for achieving reversible operation in the basic circuit.

This specification has disclosed a new and improved electronic control circuit for controlling the operation of electrical motors. While it is realized that the above specification may indicate to those in the art additional ways in which the principles of this invention may be used without departing from its spirit, it is intended that this invention be limited only by the scope of the appended claims.

What is claimed is:

1. A system for controlling the energization of an electrical motor, said system comprising a power control means, said power control means operating to control the energization of an electrical motor by supplying to a motor from a source of electrical energy electrical pulses which vary in time duration and spacing in accordance with an input condition, a voltage controlled variable frequency oscillator, the output frequency of said oscillator being determined by an input potential, means for applying the output from said oscillator to said power control means to determine when pulses are applied to said motor, a differential amplifier having one output and two inputs, means for connecting the output from said amplifier to the control input of said oscillator, means for connecting to one input of said amplifier a potential representative of said input condition, a sample-and-hold circuit, mean for connecting the sample input of said sample-and-hold circuit to said motor, means for connecting the output of said sample-and-hold circuit to the other input of said amplifier, and means for connecting the sample control of said sample-and-hold circuit to the output of said oscillator so that said sample-and-hold circuit samples the motor counter EMF whenever power is not supplied to said motor.

2. The system defined in claim 1 wherein said power control means comprises an input, and output, and a control terminal, means for connecting said input to a source of electrical energy, means for connecting said output to said motor, and means for connecting said control terminal to the output of said oscillator so that said oscillator output determines when said power control means connects the output from said source of electrical energy to said motor, to control the speed of said motor.

3. The system defined in claim 2 wherein said power control means comprises a plurality of electronic valves, each of said valves comprisng a main conductive path and a control means for said main conductive path, means for connecting said main conductive paths of said valves to form a full wave circuit, and means for connecting the control means for said main conductive paths to the output of said oscillator so that said valves conduct when the polarity across said main conductive path and the signal applied to said control means are of the proper form.

References Cited
UNITED STATES PATENTS

| | | | |
|---|---|---|---|
| 3,214,666 | 10/1965 | Clerc | 318—331 X |
| 3,249,840 | 5/1966 | Eriksson | 318—331 |
| 3,382,457 | 5/1968 | Conway | 331—113 |
| 3,401,324 | 9/1968 | James | 318—331 X |

ORIS L. RADER, Primary Examiner

T. LANGER, Assistant Examiner

U.S. Cl. X.R.

318—341